Feb. 3, 1959     F. F. KOSKENMAKI     2,871,959
CULTIVATOR
Filed Oct. 10, 1955     2 Sheets-Sheet 1
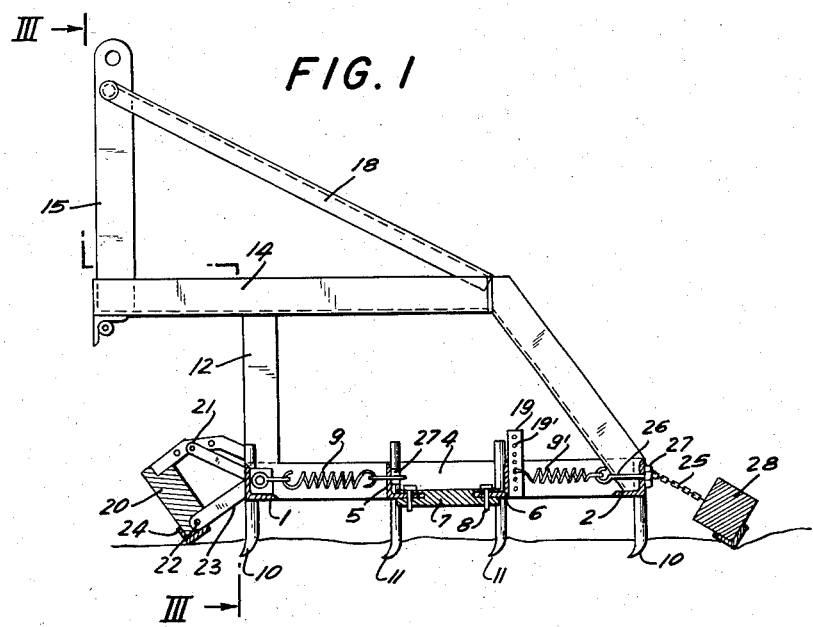
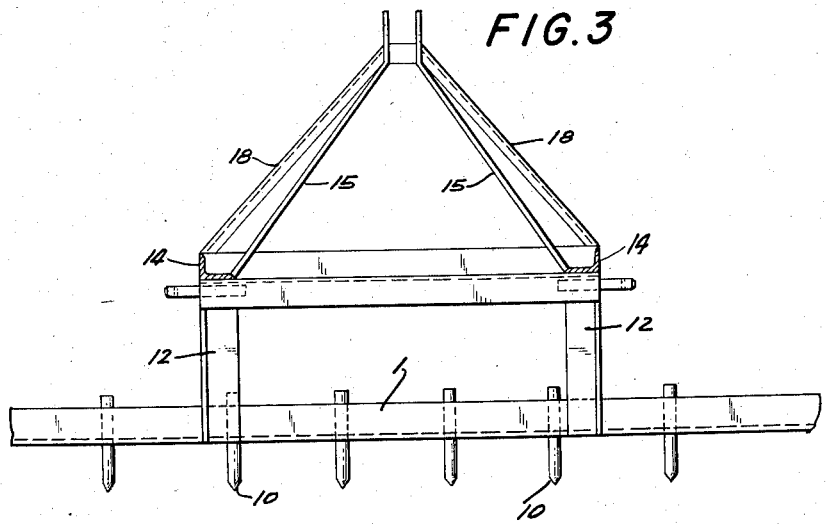
INVENTOR.
Frans Fredrik Koskenmaki
BY Michael S. Striker
Attorney

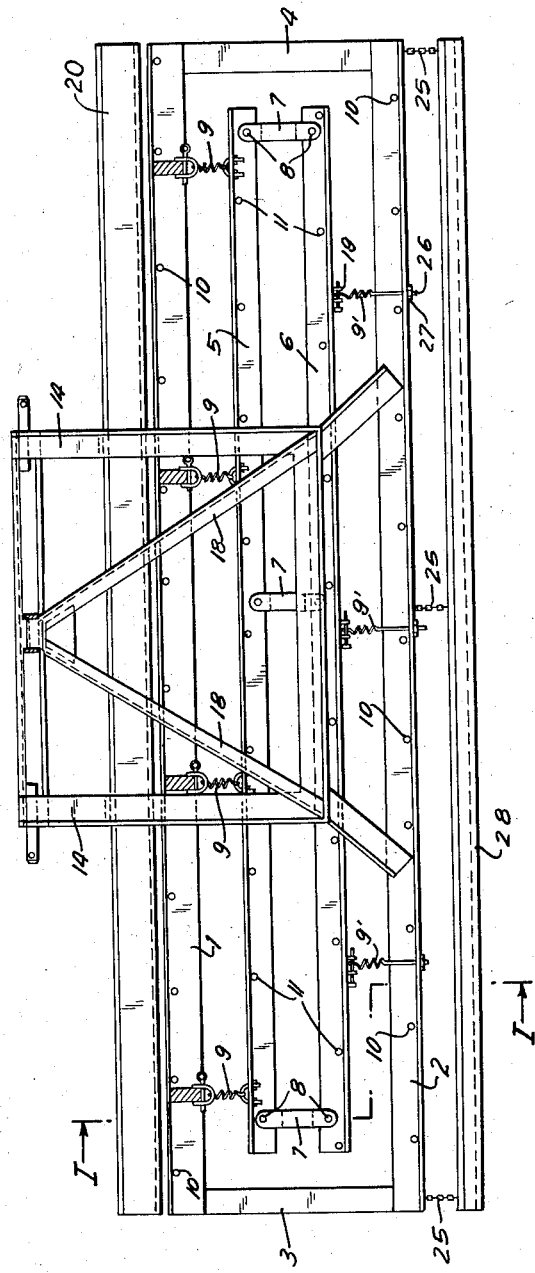

United States Patent Office 2,871,959
Patented Feb. 3, 1959

2,871,959

CULTIVATOR

Frans Fredrik Koskenmaki, Salo, Finland

Application October 10, 1955, Serial No. 539,635

Claims priority, application Finland October 18, 1954

8 Claims. (Cl. 172—197)

The present invention refers to cultivators and more particularly to the harrow type cultivators.

Usually, this type of cultivator comprises cultivating members or tines which are made flexible by means of springs attached individually to each of these tines.

It is an object of the present invention to provide a cultivator of the type set forth which does not require individual spring means for each tine but comprises spring means cooperating with a plurality of tines simultaneously. Hereby the structure of the cultivator is simplified and its efficiency greatly improved.

With the above objects in view, the cultivator according to this invention mainly consists of an open outer frame of elongated form and attachment means on this frame adapted to be connected to means for pulling the cultivator along the ground in a predetermined direction. The cultivator further comprises a second frame located within the outer frame and spaced therefrom, the second frame being movable with respect to the outer frame. Spring means are provided for connecting the second or inner frame with the outer frame so as to resiliently attach the former to the latter in a manner permitting movement at least in said predetermined direction. A plurality of cultivating members are provided, a number of which are attached to the outer frame while another plurality thereof is attached to the second frame, all said members being spaced from each other and projecting from the particular frame substantially parallel to each other so that when said outer frame is pulled by means of said attachment means along the ground resiliently carrying along said second frame, with said cultivating members of both frames in engagement with the ground, the cultivating members atached to said second frame are caused by varying resistance to oscillate together with said resiliently supported second frame with respect to the cultivating members attached to said outer frame in order to further break down by their reciprocating action portions of the ground cut by the cultivating members attached to the outer frame.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a lateral elevation partially in cross section, of a preferred embodiment of the invention, the section being taken along line I—I of Fig. 2;

Fig. 2 is a plan view of the device illustrated by Fig. 1, showing the drag and the smoothing bars attached thereto; and Fig. 3 is a fragmentary front view, partially in cross section showing certain details of the embodiment illustrated by Figs. 1 and 2, the section being taken along line III—III in Fig. 1.

Parallel bars 1 and 2 are firmly joined to each other by cross-bars 3 and 4 and form the rigid frame of the cultivator. In this way bars 1 and 2 are kept at a fixed distance from each other.

The bars 1 and 2 and the cross-bars 3 and 4 form a rectangular frame having an opening in the center in which there is arranged another smaller frame, approximately of the same shape, formed by the bars 5 and 6 and parallel with bars 1 and 2. The cross-bars 5 and 6 are held parallel with each other at a variable distance by the cross-links 7. Fig. 1 shows the supporting crosslinks 7 straddling the bars 5 and 6 at each end. The bars and links are joined to each other by the pins 8. The inner frame, formed by the bars 5 and 6 and the cross-links 7, is joined to the outer frame by springs 9, 9'.

The harrow tines 10 and 11 are mounted on the inner and on the outer frames respectively, penetrating the framework of the cultivator. The protruding length of the tines 10 and 11 may be adjusted for shallow or deep cultivation. This adjustment may be effected by some conventional device, for instance fasteners that may be loosened to adjust the tines to any desired length and may then be tightened to hold them in place at the desired depth.

The harrow is to be attached to its traction vehicle by a conventional device of any type customary for attaching tillage equipment, engaging the outer frame of the cultivator. Such hitching equipment is designated in Fig. 1 by the bars and braces 12 and 14, 15, 18. The pulling bars and braces 12, 14, 15, 18 may be attached to a tractor's hydraulic hoisting equipment so that the cultivator may be lifted completely from the ground or pressed deeper into the same. In this way the effective depth of cultivation may be regulated during operation, in addition to the separate preadjustment of the tines. Also, if the tines of the cultivator become clogged by grass, roots etc. during operation, the cultivator may be lifted from the ground for a moment by the hydraulic ram of the tractor. When the tines are cleared the cultivator may be pressed into the soil again.

Both in Figs. 1 and 2 the smoothing bar 20 in front of the cultivator and the drag 28 behind the same are shown. The purpose of the smoothing bar is levelling the soil and breaking up small clods and lumps to facilitate the work of the harrow tines in pulverizing the soil. The drag 28 behind the cultivator further pulverizes and breaks up clods and lumps left on the surface.

The position of the smoothing bar 20 may be adjusted by the strap 21, both with regard to inclination and height above the ground; the bar 20 is joined to the cultivator on its lower face by joints 22 and brackets 23. The scraping edge is reinforced against wear by means of an angle iron 24. Its rectangularity renders the smoothing bar more effective in breaking up clods in front and underneath and in smoothing the soil. The drag 28 at the back of the cultivator is attached to the outer frame by chains 25. The length of the chains 25 may be regulated and the smoothing bar may so be kept at any desired inclination. The lower edge of the drag 28 is best strengthened by an angle iron to reduce wear and to preserve the tilling qualities of the implement as long as possible.

In practice as the cultivator is pulled over the ground, the forward row of tines 10 mounted on the rigid outer frame member 1 prepares the soil by breaking up clods of soil, thus doing the heavy preliminary cultivation. After this the clods of soil come under the inner frame 5, 6 of the cultivator to be broken up by the two rows of tines 11 set in the same. Since the inner frame 5, 6 is joined to the outer frame 1, 2 by springs 9 that allow for differential resilient response when passing over different kinds of obstructions or hardness of soil the inner frame 5, 6 is set into a continuous back and forth, and side to side motion with relation to the outer frame 1, 2. Depending on the resistance of the soil and the speed of the traction vehicle the oscillating motion of the inner frame 5, 6 with respect to the outer frame 1, 2 and its predetermined direction of travel may become extremely great. The inner frame 5, 6 may oscillate in relation to the outer frame 1, 2 at the rate of several times a second. Thus the tines 11 on the inner frame 5, 6 are much more efficient in breaking up and smoothing the soil. To enhance the oscillating motion of the inner frame the bars 5 and 6 are joined to each other by the cross-links 7 and the articulated joints 8. This permits the bars 5 and 6 to move relatively lengthwise to an extent which permits them to constantly vary the distance between them.

The pretensioning of the springs 9, 9' may be regulated: to obtain this result one end of each spring is adjustably attached to one of the longitudinal frame members as shown for instance in Fig. 1. The bolts 26 are engaged in springs 9, 9' and can be adjusted by the nuts 27, i. e., to the full threaded length of bolt 26 jutting out on the opposite side of the longitudinal frame members. The tension of the back springs 9' may also be regulated by varying their point of attachment to pads 19 on the inner frame bar 6; to this purpose several holes 19' are shown at different heights of the pad 19 for fastening of the back springs 9' to the inner frame bar 6; the springs 9' may be fastened in a position deviating slightly from the horizontal in an oblique position which has proved efficient for penetrating the ground by imparting a good inclination to the rows of tines 11 on the inner frame 5, 6.

Fig. 1 shows the tines 10, 11 to be curved; nevertheless, tines of any other style may be used as well, different styles of tines, points, etc. may alternate according to condition of the soil under cultivation. The smoothing bar 20 at the front of the cultivator and the drag 28 at the rear of the same may be dispensed with, if so desired; or, on the other hand, several smoothing bars and/or drags may be attached to the cultivator.

The drawings show a cultivator with the first and fourth rows of tines 10 rigid and the second and third rows of tines 11 non-rigid with respect to the outer frame. This invention is, however, in no way limited to the number of tine rows here illustrated; rigid as well as non-rigid tine rows may be added, or even a single row of the latter may do. The rows need not necessarily be straight, and the tines may be grouped differently.

The mobility of the inner frame 5, 6 inside the outer frame 1, 2 depends on springs; these springs work only as expansion springs, i. e. the front springs 9 stretch, when the cultivator is in forward motion, while the springs 9' at the back contract, in this manner deviating from their normal condition; however, when the inner frame 5, 6 is at rest in the center of the outer frame 1, 2 the springs 9, 9' in front of and at the back of the inner frame balance each other, i. e. their respective tensions are substantially equal.

I claim:

1. A cultivator, comprising in combination, an open outer frame of elongated form; attachment means on said outer frame adapted to be connected to means for pulling said cultivator along the ground in a predetermined direction; a second frame located within said outer frame and spaced therefrom, said second frame being movable with respect to said outer frame; spring means connecting said second frame with said outer frame for resiliently attaching said second frame to said outer frame movably at least in said predetermined direction; and a plurality of cultivating members, a number of which are attached to said outer frame and a number of which are attached to said second frame and spaced from each other, said cultivating members projecting from said frame substantially parallel with each other, so that when said outer frame is pulled by means of said attachment means along the ground resiliently carrying along said second frame, with said cultivating members of both frames in engagement with the ground, the cultivating members attached to said second frame are caused by varying resistance to oscillate together with said resiliently supported second frame with respect to the cultivating members attached to said outer frame in order to further break down by their reciprocating action portions of the ground cut by the cultivating members attached to the outer frame.

2. A cultivator, comprising in combination, an open outer frame of elongated form; attachment means on said outer frame adapted to be connected to means for pulling said cultivator along the ground in a predetermined direction; a second frame located within said outer frame and spaced therefrom, said second frame being movable with respect to said outer frame, said second frame including a plurality of frame elements movably connected to each other for relative movement in a direction transverse to said predetermined direction; spring means connecting said second frame with said outer frame for resiliently attaching said second frame to said outer frame movably at least in said predetermined direction; and a plurality of cultivating members, a number of which are attached to said outer frame and a number of which are attached to each of said frame elements of said second frame and spaced from each other, said cultivating members projecting from said frames substantially parallel with each other, so that when said outer frame is pulled by means of said attachment means along the ground resiliently carrying along said second frame, with said cultivating members of both frames in engagement with the ground, the cultivating members attached to each of said frame elements of said second frame are caused by varying resistance to move transversely with respect to the cultivating members of the other frame element and to oscillate together with said resiliently supported second frame with respect to the cultivating members attached to said outer frame in order to further break down by their reciprocating action portions of the ground cut by the cultivating members attached to the outer frame.

3. A cultivator, comprising in combination, an open outer frame of elongated form; attachment means on said outer frame adapted to be connected to means for pulling said cultivator along the ground in a predetermined direction; a second frame located within said outer frame and spaced therefrom, said second frame being movable wtih respect to said outer frame; spring means connecting said second frame with said outer frame for resiliently attaching said second frame to said outer frame movably at least in said predetermined direction; and a plurality of tines, a number of which are attached to said outer frame and a number of which are attached to said second frame and spaced from each other, said tines projecting from said frames substantially parallel with each other, so that when said outer frame is pulled by means of said attachment means along the ground resiliently carrying along said second frame, with said tines of both frames in engagement with the ground, the tines attached to said second frame are caused by varying resistance to oscillate together with said resiliently supported second frame with respect to the tines attached to said outer frame in order to further break down by their reciprocating action portions of the ground cut by the tines attached to the outer frame.

4. A cultivator, comprising in combination, an open outer frame of elongated form; attachment means on said outer frame adapted to be connected to means for pulling said cultivator along the ground in a predetermined direction; a second frame located within said outer frame and spaced therefrom, said second frame being movable with respect to said outer frame, said second frame including a plurality of frame elements movably connected to each other for relative movement in a direction transverse to said predetermined direction; spring means connecting said second frame with said outer frame for resiliently attaching said second frame to said outer frame movably at least in said predetermined direction; and a plurality of tines, a number of which are attached to said outer frame and a number of which are attached to each of said frame elements of said second frame and spaced from each other, said tines projecting from said frames substantially parallel with each other, so that when said outer frame is pulled by means of said attachment means along the ground resiliently carrying along said second frame, with said second frame, with said tines of both frames in engagement with the ground, the tines attached to each of said frame elements of said second frame are caused by varying resistance to move transversely with respect to the tines of the other frame element and to oscillate together with said resiliently suported second frame with respect to the tines attached to said outer frame in order to further break down by their reciprocating action portions of the ground cut by the tines attached to the outer frame.

5. A cultivator, comprising in combination, an open outer frame of elongated form; attachment means on said outer frame adapted to be connected to means for pulling said cultivator along the ground in a predetermined direction; a second frame located within said outer frame and spaced therefrom, said second frame being movable with respect to said outer frame, said second frame including a plurality of frame elements movably connected to each other for relative movement in a direction transverse to said predetermined direction by linkage means movable with respect to both of said frame elements; spring means connecting said second frame with said outer frame for resiliently attaching said second frame to said outer frame movably at least in said predetermined direction; and a plurality of cultivating members, a number of which are attached to said outer frame and a number of which are attached to each of said frame elements of said second frame and spaced from each other, said cultivating members projecting from said frames substantially parallel with each other, so that when said outer frame is pulled by means of said attachment means along the ground resiliently carrying along said second frame, with said cultivating members of both frames in engagement with the ground, the cultivating members attached to each of said frame elements of said second frame are caused by varying resistance to move transversely with respect to the cultivating members of the other frame element and to oscillate together with said resiliently supported second frame with respect to the cultivating members attached to said outer frame in order to further break down by their reciprocating action portions of the ground cut by the cultivating members attached to the outer frame.

6. A cultivator, comprising in combination, an open outer frame of elongated form; attachment means on said outer frame adapted to be connected to means for pulling said cultivator along the ground in a predetermined direction; a second frame located within said outer frame and spaced therefrom, said second frame being movable with respect to said outer frame; spring means connecting said second frame with said outer frame for resiliently attaching said second frame to said outer frame movably at least in said predetermined direction; and a plurality of cultivating members, a number of which are attached to said outer frame and a number of which are attached to said second frame and spaced from each other, said cultivating members projecting from said frames substantially parallel with each other, and including adjustment means for changing the amount of projection, so that when said outer frame is pulled by means of said attachment means along the ground resiliently carrying along said second frame, with said cultivating members of both frames in engagement with the ground, the cultivating members attached to said second frame are caused by varying resistance to oscillate together with said resiliently supported second frame with respect to the cultivating members attached to said outer frame in order to further break down by their reciprocating action portions of the ground cut by the cultivating members attached to the outer frame.

7. A cultivator, comprising in combination, an open outer frame of elongated form; attachment means on said outer frame adapted to be connected to means for pulling said cultivator along the ground in a predetermined direction; a second frame located within said outer frame and spaced therefrom, said second frame being movable with respect to said outer frame; spring means connecting said second frame with said outer frame for resiliently attaching said second frame to said outer frame movably at least in said predetermined direction; a plurality of cultivating members, a number of which are attached to said outer frame and a number of which are attached to said second frame and spaced from each other, said cultivating members projecting from said frames substantially parallel with each other, so that when said outer frame is pulled by means of said attachment means along the ground resiliently carrying along said second frame, with said cultivating members of both frames in engagement with the ground, the cultivating members attached to said second frame are caused by varying resistance to oscillate together with said resiliently supported second frame with respect to the cultivating members attached to said outer frame in order to further break down by their reciprocating action portions of the ground cut by the cultivating members attached to the outer frame; and at least one smoothing member adjustably attached to said outer frame along the side thereof facing in said predetermined direction and adapted to smooth the ground ahead of the cultivator when said outer frame is pulled along the ground.

8. A cultivator, comprising in combination, an open outer frame of elongated form; attachment means on said outer frame adapted to be connected to means for pulling said cultivator along the ground in a predetermined direction; a second frame located within said outer frame and spaced therefrom, said second frame being movable with respect to said outer frame; spring means connecting said second frame with said outer frame for resiliently attaching said second frame to said outer frame movably at least in said predetermined direction; a plurality of cultivating members, a number of which are attached to said outer frame and a number of which are attached to said second frame and spaced from each other, said cultivating members projecting from said frames substantially parallel with each other, so that when said outer frame is pulled by means of said attachment means along the ground resiliently carrying along said second frame, with said cultivating members of both frames in engagement with the ground, the cultivating members attached to said second frame are caused by varying resistance to oscillate together with said resiliently supported second frame with respect to the cultivating members attached to said outer frame in order to further break down by their reciprocating action portions of the ground cut by the cultivating members attached to the outer frame, and at least one drag means movably attached to said outer frame along the side thereof facing in direction opposite to said predetermined direction and adapted to even out the ground cultivated by the cultivator when said outer frame is pulled along the ground.

References Cited in the file of this patent

UNITED STATES PATENTS

| | | |
|---|---|---|
| 1,295,484 | Hald | Feb. 25, 1919 |
| 1,420,698 | Hanson | June 27, 1922 |
| 1,687,422 | Bensien | Oct. 9, 1928 |
| 2,591,028 | Udy | Apr. 1, 1952 |
| 2,652,760 | Card | Sept. 22, 1953 |
| 2,736,252 | Latshaw | Feb. 28, 1956 |

FOREIGN PATENTS

| | | |
|---|---|---|
| 2,699 | Great Britain | of 1882 |
| 425,297 | Germany | Mar. 29, 1926 |
| 94,116 | Sweden | Jan. 9, 1939 |
| 251,590 | Switzerland | Aug. 16, 1948 |